US008644168B2

(12) United States Patent  
Saitoh

(10) Patent No.: US 8,644,168 B2
(45) Date of Patent: Feb. 4, 2014

(54) COMMUNICATION APPARATUS, COMMUNICATION SYSTEM, CONFERENCE SYSTEM, AND PROGRAM PRODUCT THEREFOR

(75) Inventor: Toshiya Saitoh, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1673 days.

(21) Appl. No.: 11/694,862

(22) Filed: Mar. 30, 2007

(65) Prior Publication Data

US 2008/0056138 A1   Mar. 6, 2008

(30) Foreign Application Priority Data

Aug. 31, 2006   (JP) .................................. 2006-237059

(51) Int. Cl.
*H04J 3/14*   (2006.01)
(52) U.S. Cl.
USPC ............................................................ 370/248
(58) Field of Classification Search
USPC .......................................... 370/248, 252, 253
See application file for complete search history.

(56) References Cited

U.S. PATENT DOCUMENTS

| 6,782,429 | B1 * | 8/2004 | Kisor | ............................ | 709/241 |
| 7,039,715 | B2 * | 5/2006 | England et al. | ............... | 709/232 |
| 7,245,915 | B2 * | 7/2007 | Matta et al. | .................... | 455/436 |
| 2005/0036447 | A1 * | 2/2005 | Mawhinney et al. | ......... | 370/230 |
| 2007/0041351 | A1 * | 2/2007 | Hazra et al. | .................... | 370/338 |
| 2007/0171816 | A1 * | 7/2007 | Pfleging et al. | ............... | 370/225 |

FOREIGN PATENT DOCUMENTS

| JP | 10-276236 A | 10/1998 |
| JP | 2002-064559 A | 2/2002 |
| JP | 2002-111722 A | 4/2002 |
| JP | 2002-252638 A | 9/2002 |
| JP | 2003-46539 A | 2/2003 |
| JP | 2004-235978 A | 8/2004 |
| JP | 2004-274702 A | 9/2004 |
| JP | 2005-210588 A | 8/2005 |
| JP | 2005-525013 A | 8/2005 |
| JP | 2005-268843 A | 9/2005 |
| WO | WO 03/094017 A1 | 11/2003 |
| WO | 2004/093394 A1 | 10/2004 |

OTHER PUBLICATIONS

Japanese Office Action in JPA No. 2006-237059, titled "Notification of Reasons for Refusal" dated Jan. 5, 2011.

* cited by examiner

*Primary Examiner* — Mark Rinehart
*Assistant Examiner* — Mohammad Anwar
(74) *Attorney, Agent, or Firm* — Sughrue Mion, PLLC

(57) ABSTRACT

A communication apparatus includes a determination portion determining a communication path over which first information to be communicated is routed, on the basis of second information corresponding to communication qualities of multiple communication paths provided between a first site and a second site.

3 Claims, 18 Drawing Sheets

FIG. 4

| DESTINATION ADDRESS | SUBNET MASK | GATEWAY | INTERFACE | OPTIMUM ROUTE DETERMINATION VALUE | EVALUATION VALUE ||||
|---|---|---|---|---|---|---|---|---|
| | | | | | BAND WIDTH | DELAY | RELIABILITY | STABILITY |
| 0.0.0.0 | 0.0.0.0 | 10.0.0.1 | 10.0.0.128 | 20 | 0 | 0 | 0 | 0 |
| 192.168.0.0 | 255.255.0.0 | 10.0.0.2 | 10.0.0.128 | 10 | 5 | 7 | 3 | 1 |
| 192.168.0.0 | 255.255.0.0 | 10.0.0.3 | 10.0.0.128 | 10 | 7 | 6 | 3 | 2 |
| 192.168.0.0 | 255.255.0.0 | 10.0.0.1 | 10.0.0.128 | 10 | 2 | 2 | 5 | 6 |

CHARACTERISTIC VALUE

COMMUNICATION APPARATUS, COMMUNICATION SYSTEM, CONFERENCE SYSTEM, AND PROGRAM PRODUCT THEREFOR

BACKGROUND

1. Technical Field

This invention relates to a communication apparatus, communication system, conference system, and program product therefor.

2. Related Art

Multihomed network is known as one of the techniques for large volume communication over public line networks. In the multihomed network, the connection is established with an Internet Service Provider (ISP) with multiple physical circuits, or with multiple ISPs. The multihomed network is a technique for aiming at load distribution, improvement of communication processing ability, and improvement of reliability, by use of multiple connection paths.

SUMMARY

According to an aspect of the present invention, there is provided a communication apparatus including a determination portion determining a communication path over which first information to be communicated is routed, on the basis of second information corresponding to communication qualities of multiple communication paths provided between a first site and a second site.

BRIEF DESCRIPTION OF THE DRAWINGS

Exemplary embodiments of the present invention will be described in detail based on the following figures, wherein:

FIG. 4 shows a configuration of an extended forwarding table;

DETAILED DESCRIPTION

A description will now be given, with reference to the accompanying drawings, of exemplary embodiments of the present invention.

(First Exemplary Embodiment)
(System Configuration)

Figure 1:
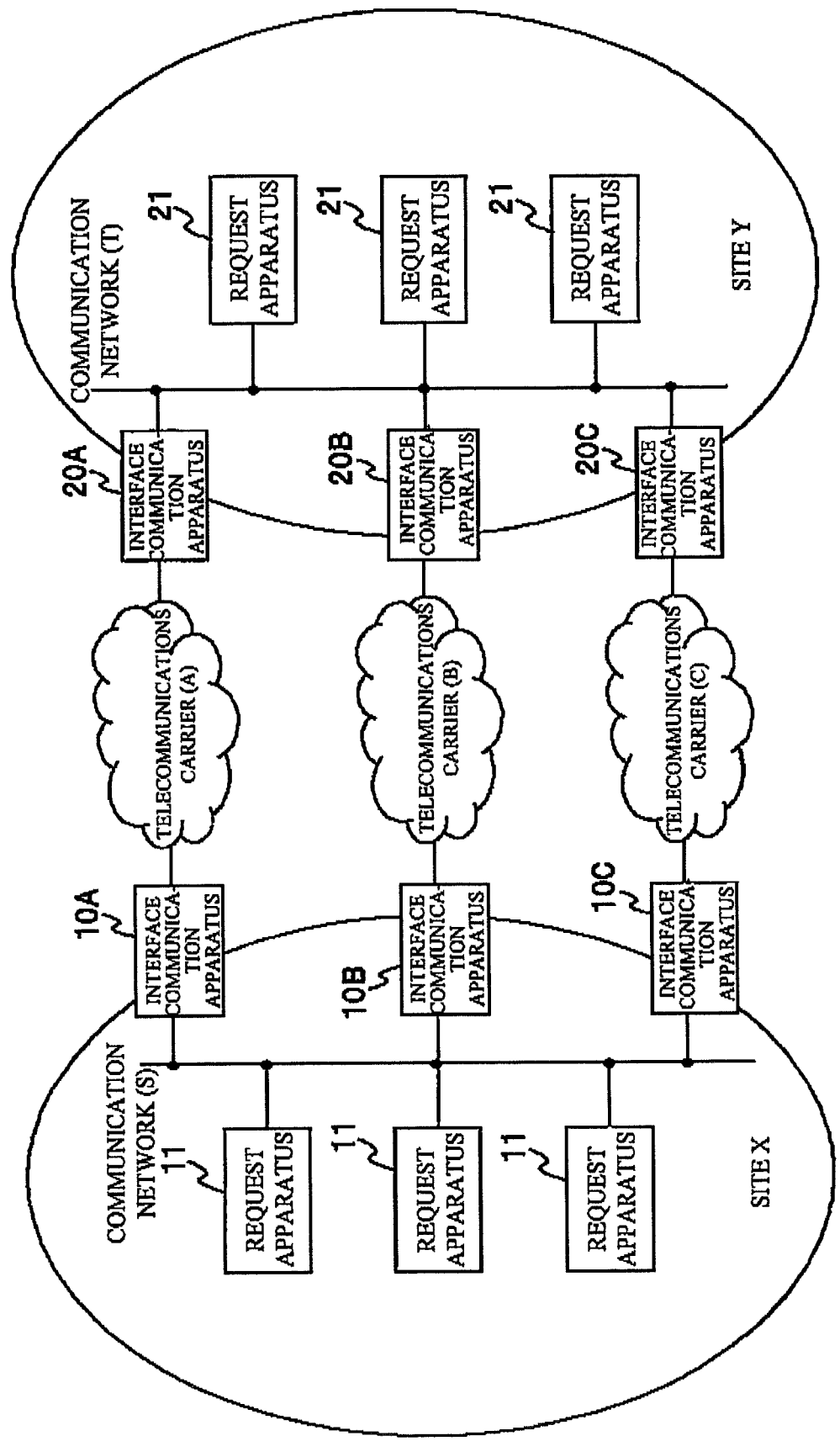
FIG. 1 shows a system configuration in which a site X and a site Y are connected by multiple communication paths.

Hereinafter, a system configuration used in a first exemplary embodiment of the present invention will be described with reference to the accompanying drawings. The first S exemplary embodiment is a system where a site X is connected to a site Y by communication paths. Referring to FIG. 1, the site X and the site Y may be connected by means of telecommunications services supplied by telecommunications carriers via public communication lines such as the Internet. Alternatively, a communication path connected by a dedicated line or a dial-up connection may be included. There is more than one communication path connecting the site X and the site Y.

Communication networks such as, for example, Local Area networks (LANs) are installed in the site X and the site Y. There are provided multiple request apparatuses 11 and 21 over the communication networks. Hereinafter, the communication network installed in the site X is referred to as a communication network (S), and the communication network installed in the site Y is referred to as a communication network (T).

There are respectively provided in the interface with the dedicated line and the public communication lines, interface communication apparatuses 10A, 10B, 10C, 20A, 20B, and 20C, each of which is composed of, for example, a router, and serves as determination portion. In FIG. 1, the interface communication apparatuses 10A and the interface communication apparatuses 20A are connected to the public communication lines supplied by a telecommunications carrier (A). In a similar manner, the interface communication apparatuses 10B and the interface communication apparatuses 20B are connected to the public communication lines supplied by a telecommunications carrier (B), and the interface communication apparatuses 10C and 20C are connected to the public communication lines supplied by a telecommunications carrier (C). Hereinafter, the interface communication apparatuses 10A, 10B, 10C, 20A, 20B, and 20C are equipped with an identical function, and will be collectively denoted by the interface communication apparatuses 10 and 20.

The afore-mentioned communication devices are respectively equipped with a functionality of Virtual Private Network (VPN) with IP Security Protocol (IP Sec) for encrypted communication over a public line network or Secure Socket Layer (SSL). By use of the VPN functionality of the interface communication apparatuses 10 and 20, a virtual private network (VPN) is established among the interface communication apparatuses 10 in the site X and interface communication apparatuses 20 in the site Y such that data is encrypted and local addresses representing identification information assigned to the communication network in the organization are encapsulated, in other words, information is encompassed.

(Configuration of Interface Communication Apparatus)

A description will now be given of a configuration of the interface communication apparatuses 10 and 20 employed in the present exemplary embodiment. Each of the interface communication apparatuses 10 and 20 is a communication device having a data relay functionality, determines the forward destination according to header information applied to the received data, and forwards the data to the forward destination. In particular, the interface communication apparatuses 10 and 20 employed in the present exemplary embodiment respectively monitor the communication states of the public line networks, and exchange communication information representing the communication states of the communication paths with each other. When communication is established between the site X and the site Y, the priority of the communication path is dynamically changed according to the communication state of each communication path, so that data is distributed in a most suitable manner.

Figure 3:
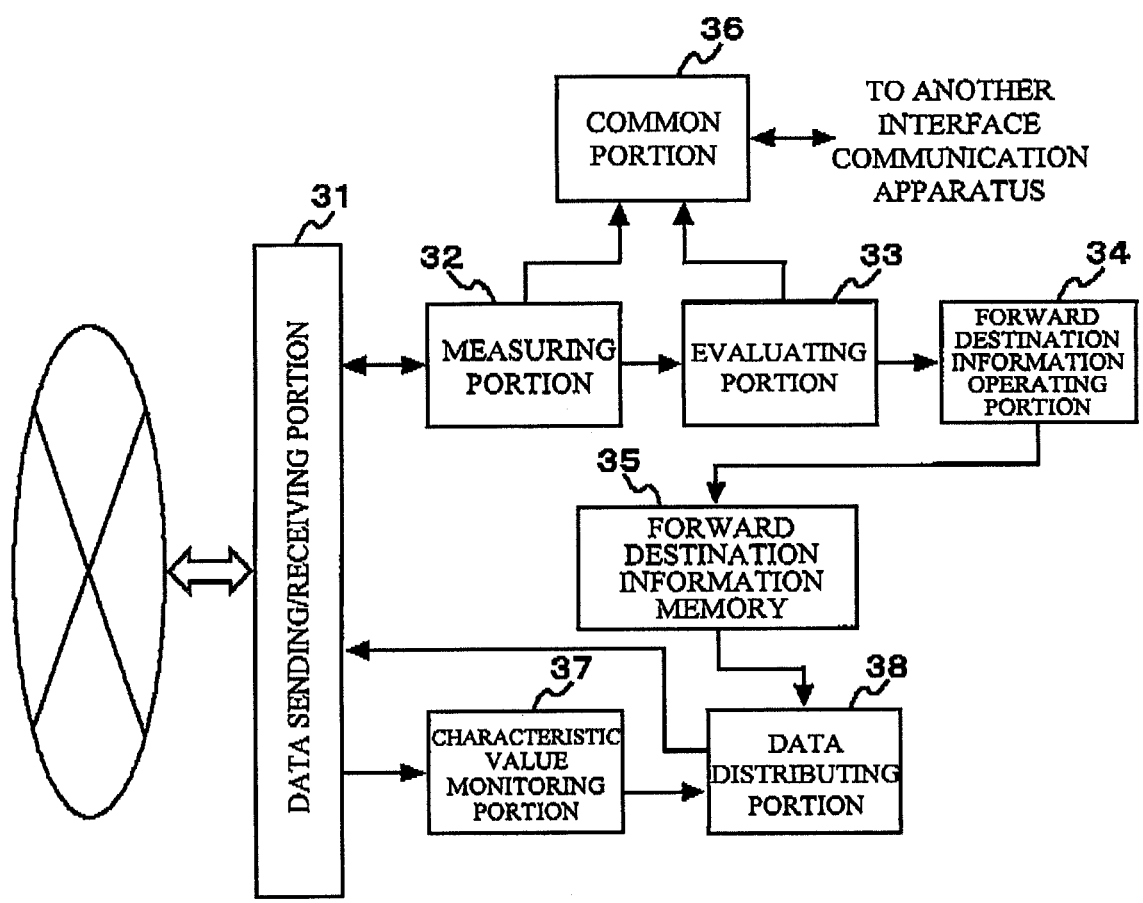
FIG. 3 shows a configuration of an interface communication apparatus.

FIG. 3 shows a configuration of the interface communication apparatus 10. Since the interface communication apparatus 20 has the same configuration as that of the interface communication apparatus 10, the description of the interface communication apparatus 20 will be omitted here. The interface communication apparatus 10 includes: a data transmitter/receiver 31; a measuring portion 32; an evaluating portion 33; a forward destination information operator 34; a forward destination information memory 35; a common portion 36; a characteristic value monitor 37; and a data distributor 38.

The data transmitter/receiver 31 sends data and data for measurement to measure the communication state of a communication path, and receives data through the communication path. The received data is output to the characteristic value monitor 37.

The measuring portion 32 sends the data for measurement to the communication path connecting the site X and the site Y, and measures the communication state of the communication path. The measurement method will be described later in detail.

The evaluating portion 33 evaluates communication qualities of the communication paths connecting the sites, on the basis of the measurement result of the measuring portion 32.

The forward destination information operator 34 changes forward destination information stored in the forward destination information memory 35, on the basis of the evaluation result of the evaluating portion 33.

The forward destination information memory 35 stores the forward destination information shown in FIG. 4. The forward destination information includes: destination address; subnet mask; gateway (designating a gateway IP address used by a route); interface (designating interface that is routed); optimal path selection; and evaluation value. In addition to an optimum route determination value, the evaluation value stores evaluation values evaluated by the evaluating portion 33 described later.

The common portion 36 is a functional portion that notifies the communication state of the communication path, measured by the measuring portion 32, and the evaluation result of the evaluating portion 33, to other interface communication apparatuses 10 and 20. In addition, the common portion 36 notifies data amount output to the communication path and a measurement start time of the communication state, to the interface communication apparatus at a receiving side, when the measuring portion 32 measures the communication state of the communication path. The common portion 36 is connected with the interface communication apparatus 20 at another site by a control line, not shown. The evaluation result and the measurement start time are notified by way of the control line.

Optionally, the interface communication apparatuses 10A, 10B, and 10C may establish communication by use of the data link layer protocol or the network layer protocol of the OSI reference model. In order to establish communication with the network layer protocol, an administrator makes a setting with the information that can identifies the communication device, such as Internet Protocol (IP) address, Fully Qualified Domain Name (FQDN), Media Access Control (MAC) address, the communication device identification information, or the like. According to the setting information, the measurement result of the communication path or the evaluation result is exchanged. Here, each of the interface communication apparatuses 20A, 20B, and 20C establishes communication in a similar manner.

The characteristic value monitor 37 is a functional portion that refers to a characteristic value applied to the data, when relaying the data sent from the request apparatus 11 to another site. In addition, the data distributor 38 is a functional portion that selects the interface communication apparatus that forwards the data with the use of the characteristic value referred to by the characteristic value monitor 37.

Figure 5:
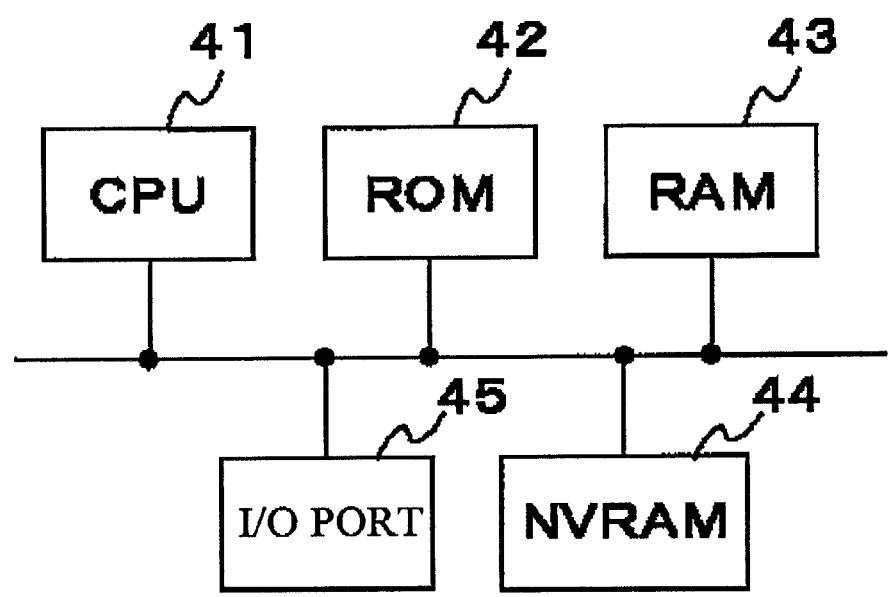
FIG. 5 shows a hardware configuration when the interface communication apparatus is achieved by software control.

Optionally, the interface communication apparatuses 10 and 20 shown in FIG. 3 may be controlled by software. FIG. 5 shows a configuration of a case where the interface communication apparatuses 10 and 20 are operated by software. Each of the interface communication apparatuses 10 and 20 is provided with: a CPU 41; a ROM 42; a RAM 43; an Non-Volatile RAM (NVRAM) 44; and an I/O port 45.

The CPU 41 reads a program stored in the ROM 42, and performs an operation according to the program. The control shown in a flowchart described later is performed. Also, data of the operation result or print completed page is written into the RAM 43, and the data written in the RAM 43 and also necessary to be stored at the time of power off is written into the NVRAM 44.

Optionally, the program stored in the ROM 42 may be stored in the NVRAM 44, after read from a recording medium such as a CD-ROM or the like, or may be stored in the NVRAM 44 after the I/O port 45 receives the program transmitted through the communication network.

Figure 2:
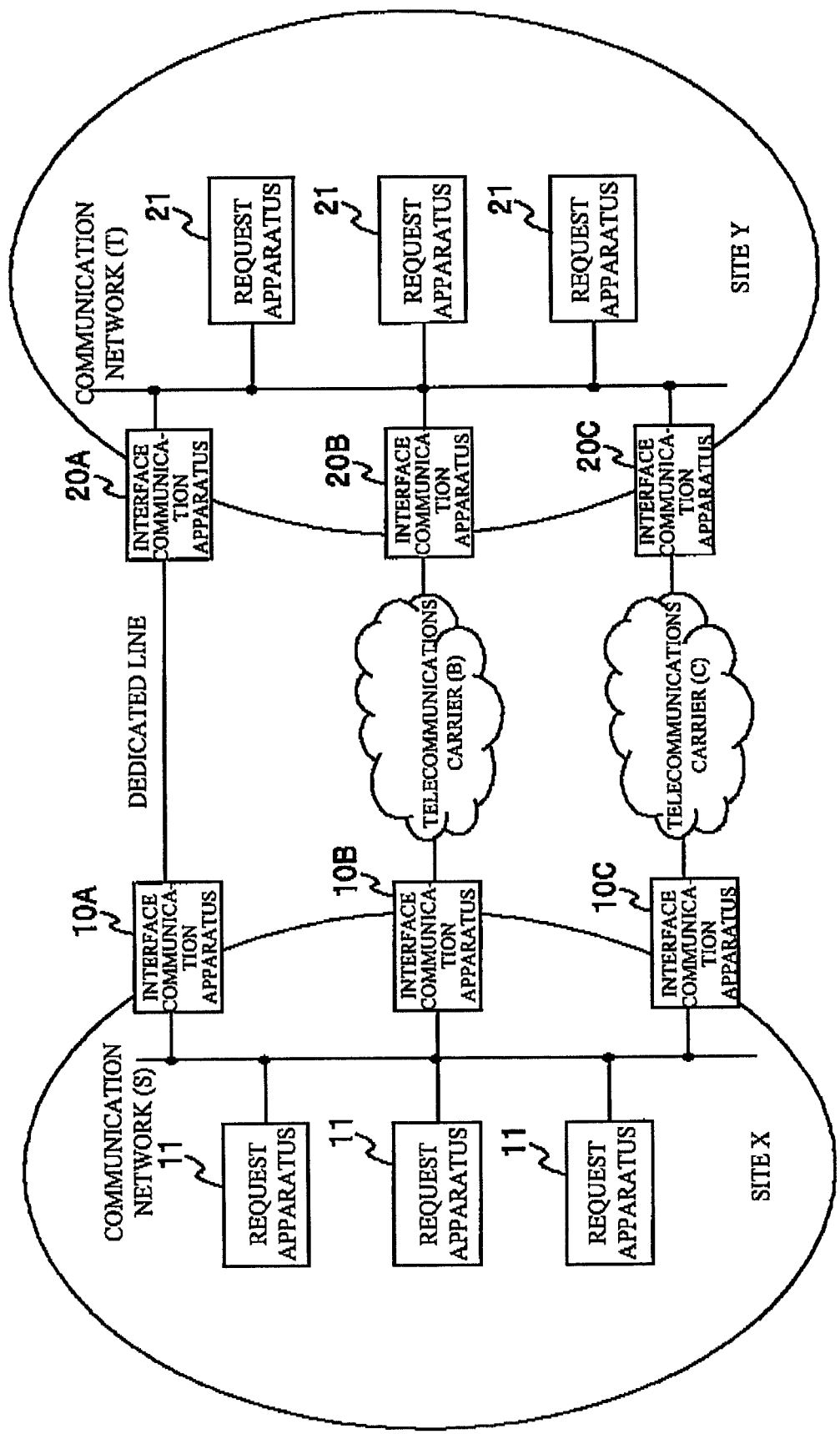
FIG. 2 shows another system configuration in which one of the communication paths is connected by a dedicated line.
Figure 6:
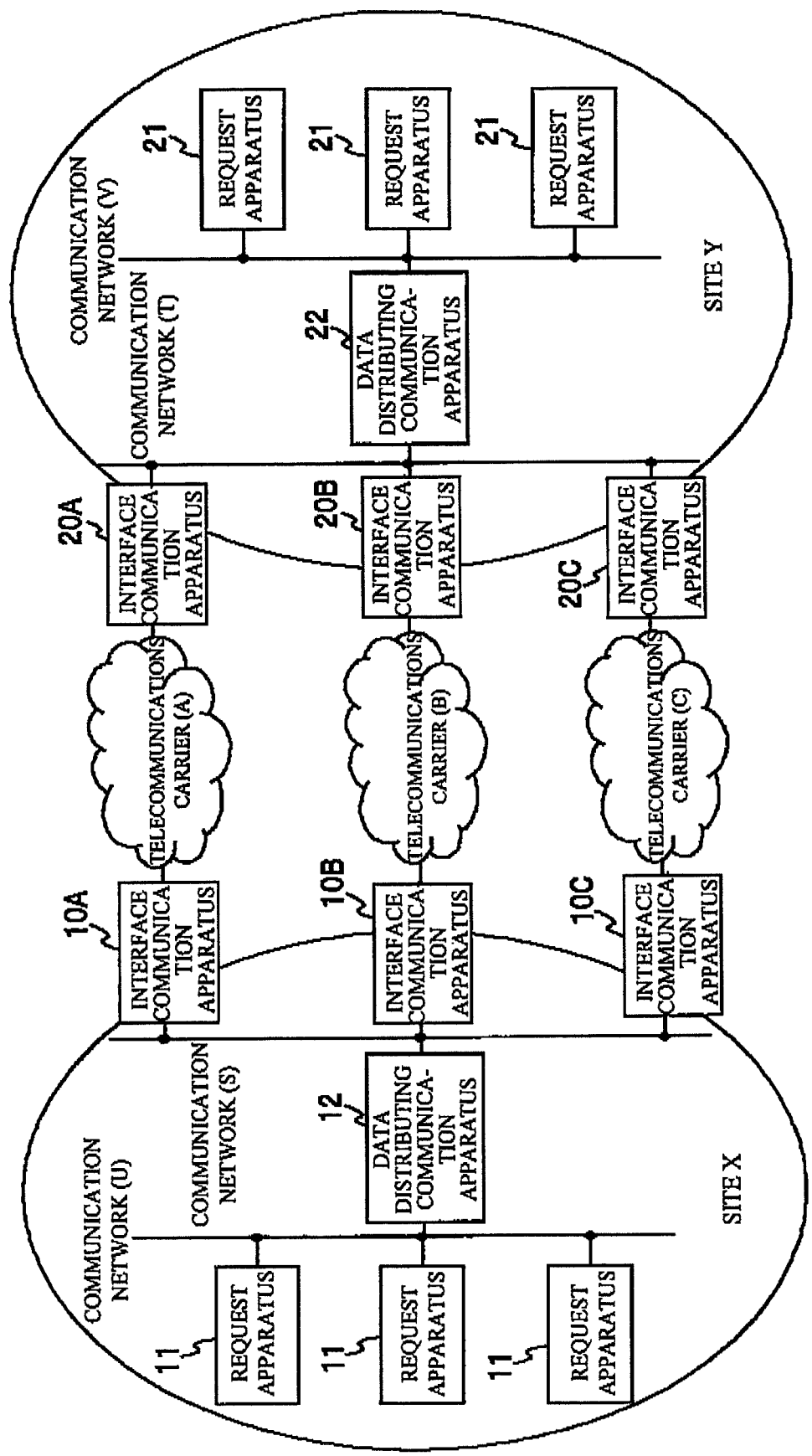
FIG. 6 shows a system configuration of central control.

Alternatively, the system configuration employed in the present exemplary embodiment is not limited to those shown in FIG. 1 and FIG. 2. The system configuration shown in FIG. 6 maybe employed. In the system shown in FIG. 6, data distributing communication apparatuses 12 and 22, each serving as a second communication apparatus, collectively manage the communication qualities of the communication paths. In FIG. 6, each of the interface communication apparatuses 10A, 10B, and 10C provided at the site X and each of the interface communication apparatuses 20A, 20B, and 20C provided at the site Y measures the communication states of the communication paths, or evaluates the communication qualities according to the communication states of the measured communication paths. The interface communication apparatuses 10 and 20 respectively serve as a first communication apparatus. The measurement result and the evaluation result are transferred to the data distributing communication apparatuses 12 and 22 from the interface communication apparatuses 10 and 20. The data distributing communication apparatuses 12 and 22 set data suitable for the communication in each communication path, on the basis of the evaluation result of the communication path.

Figure 17A:
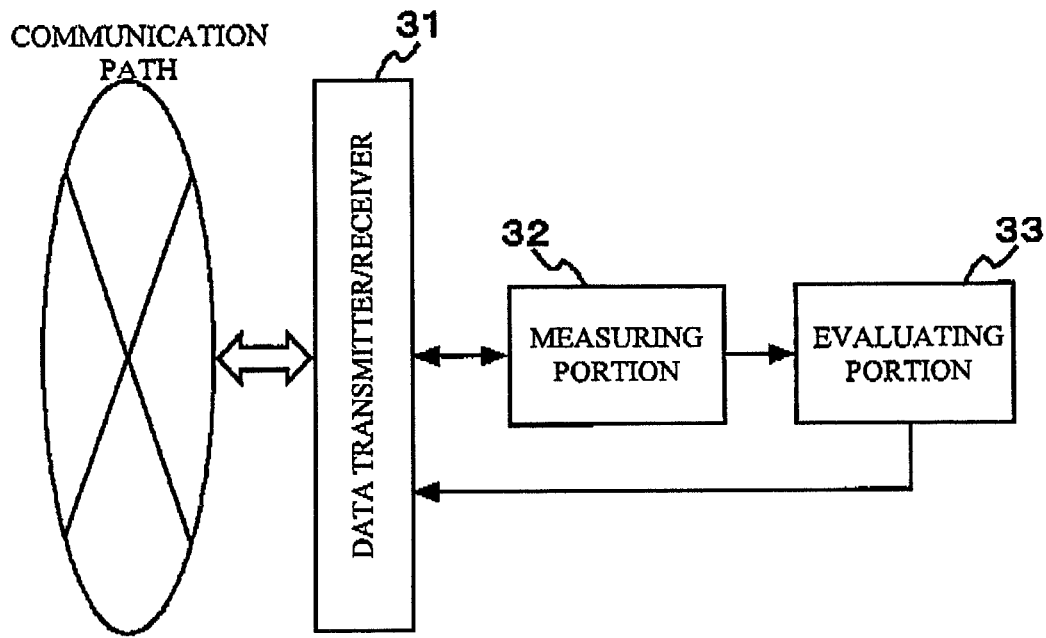
FIG. 17A shows a configuration example of the interface communication apparatus.
Figure 17B:
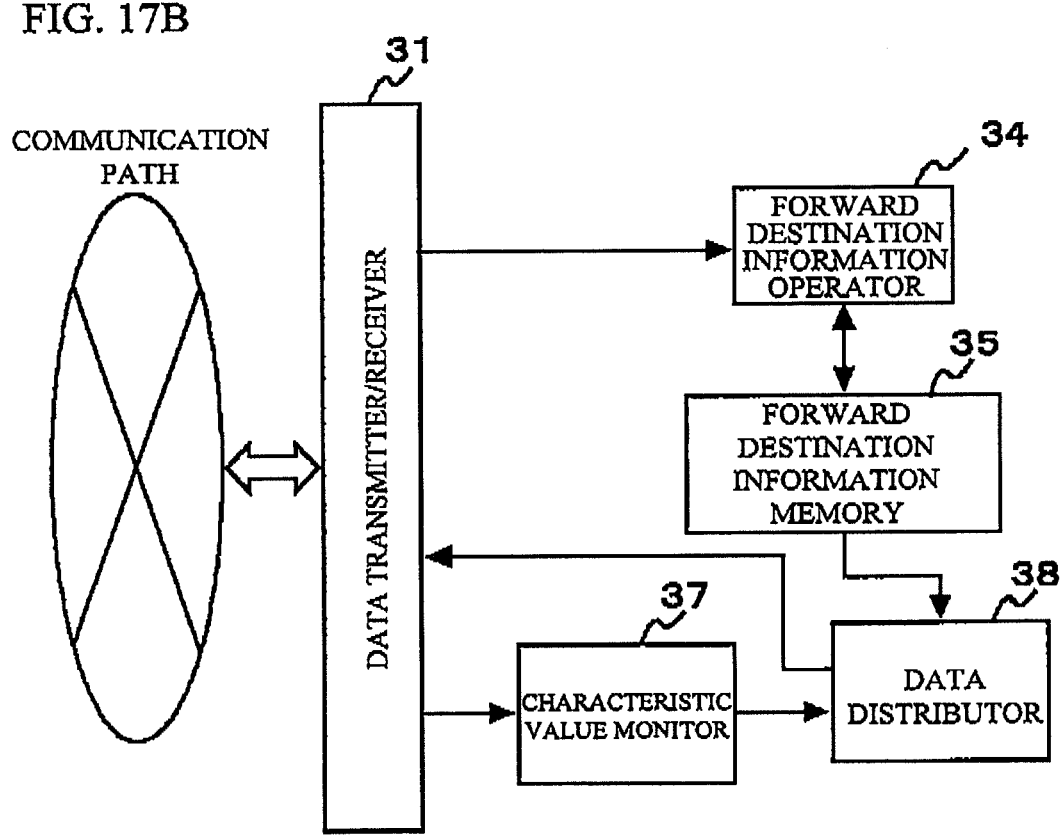
FIG. 17B shows a configuration example of the data distributing communication device.

FIG. 17A, FIG. 17B, FIG. 18A, and FIG. 18B show configurations of the interface communication apparatuses 10 and 20 and the data distributing communication apparatuses 12 and 22. FIG. 17A shows a configuration in which there are provided the measuring portion 32 and the evaluating portion 33 in each of the interface communication apparatuses 10 and 20 and the evaluation result of the communication quality of the communication path is sent to the data distributing communication apparatuses 12 and 22. The evaluation result is sent to the communication network such as a LAN or the like by the data transmitter/receiver 31r and is sent to the data distributing communication apparatuses 12 and 22. FIG. 17B shows each of the data distributing communication apparatuses 12 and 22 where the evaluation result of the communication quality is received by the data transmitter/receiver 31 and the information is rewritten at the forward destination information operator 34.

Figure 18A:
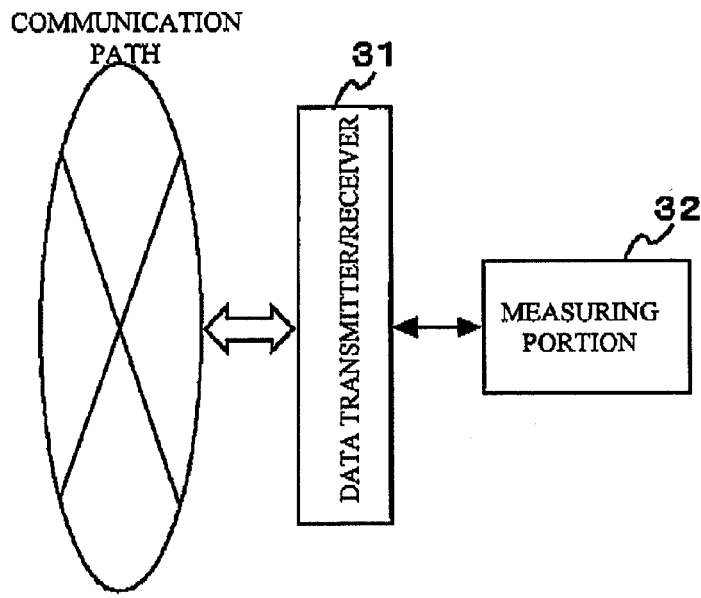
FIG. 18A shows another configuration example of the interface communication apparatus.
Figure 18B:
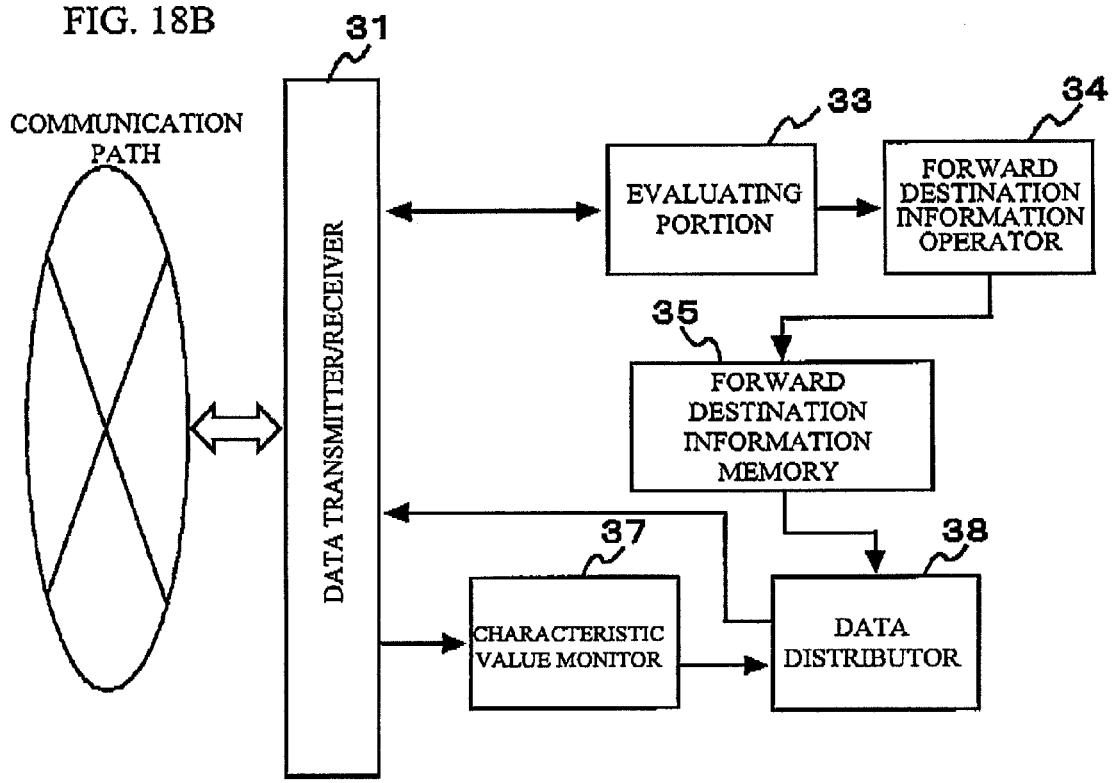
FIG. 18B shows another configuration example of the data distributing communication device.

FIG. 18A shows a configuration in which there is provided the measuring portion 32 in each of the interface communication apparatuses 10 and 20 and the measurement data representing the communication state of the communication path is sent to the data distributing communication apparatuses 12 and 22. The measurement result is output to the communication network such as a LAN by the data transmitter/receiver 31, and is sent to the data distributing communication apparatuses 12 and 22. FIG. 1SB shows each of the data distributing communication apparatuses 12 and 22 where the measurement result of the communication quality is received by the data transmitter/receiver 31 and the communication quality of each communication path is evaluated on the basis of the measurement data. The evaluation value is rewritten at the forward destination information operator 34.

(Evaluation of Communication Path Quality)

A description will be given of a measurement method of the communication state performed by the measuring portion 32 and an evaluation method performed by the evaluating portion 33.

In accordance with the present exemplary embodiment, the request apparatuses 11 and 21 or the data distributing communication apparatuses 12 and 22 distribute data to each communication path on the basis of the information corresponding to the communication quality of the communication path. The information corresponding to the communication quality of the communication path includes: the communication state measured by the measuring portion 32 and the evaluation value of the communication path obtained by evaluating the communication state. Hereinafter, a description will be given of an example in which the communication path to which data is distributed is selected according to the evaluation result of each communication path.

Figure 7:
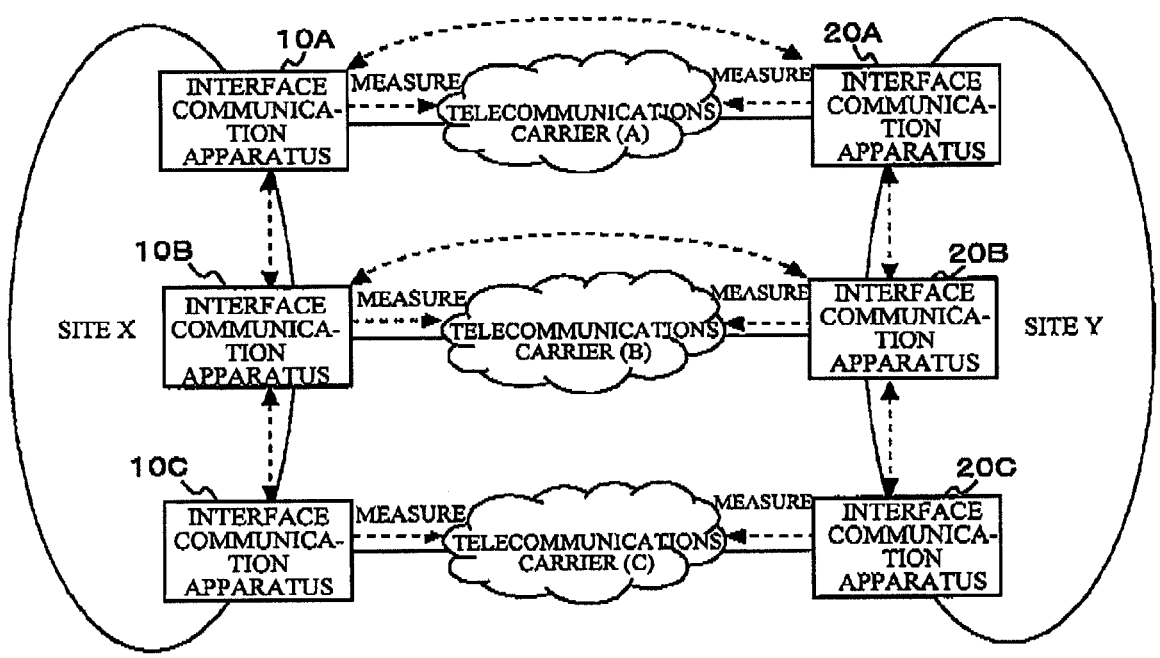
FIG. 7 schematically shows measurement and evaluation of qualities of communication paths carried out by the interface communication apparatus.

The interface communication apparatuses 10 and 20 measure the communication state of the communication path on a regular basis, as shown in FIG. 7, and evaluates the communication quality of the communication path on the basis of the measurement result. The evaluation of the public line supplied by the telecommunications carrier (A) is carried out between the interface communication apparatuses 10A and 20A, and the evaluation result is commonly shared by the interface communication apparatuses 10A and 20A. The evaluation result retained by the interface communication apparatus 10A is also notified to the interface communication apparatuses 10B and 10C at an identical site. In a similar manner, the evaluation result retained by the interface communication apparatus 20A is also notified to the interface communication apparatuses 20B and 20C at an identical site.

Also, in a similar manner, the evaluation of the public line supplied by the telecommunications carrier (B) is carried out between the interface communication apparatus 10B and the interface communication apparatus 20B, and the evaluation of the public line supplied by the telecommunications carrier (C) is carried out between the interface communication apparatus 10C and the interface communication apparatus 20C.

Optionally, the measurement result and the evaluation result are transmitted to another interface communication apparatus via a communication network such as a LAN or the like in an identical site. A control line, not shown, for connecting sites may be used to commonly share the measurement result and the evaluation result with an interface communication apparatus at another site.

The communication state is measured by measuring a throughput (data traffic volume per unit time) B [bps], round trip time (time required for data to travel back and forth between a transmitting side and a receiving side) D [msec], and data loss rate L [%].

The throughput is measured with data volume received by the interface communication apparatus and the transfer time thereof, after the interface communication apparatus at the transmitting side outputs Transmission Control Protocol (TCP) data or User Datagram Protocol (UDP) data to the communication path.

Figure 8:
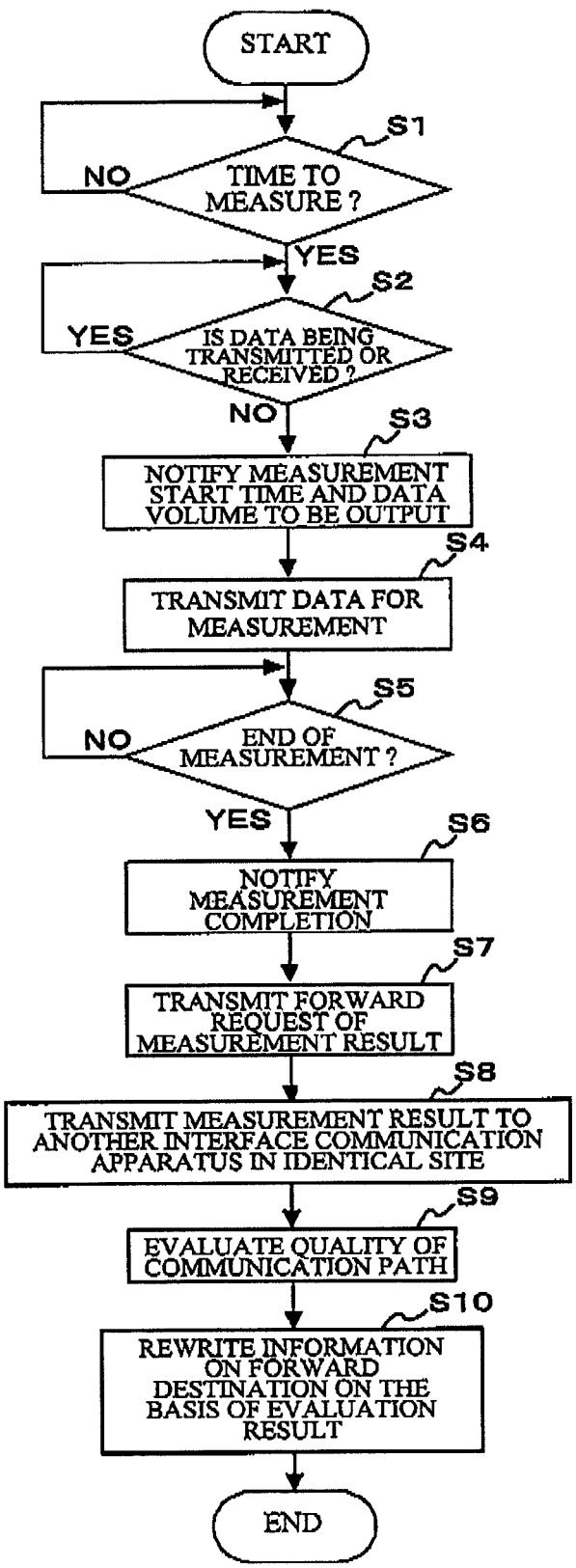
FIG. 8 is a flowchart showing a procedure of the measurement and the evaluation of the qualities of communication paths carried out by the interface communication apparatus.

A description will be given of, with reference to FIG. 8, the procedure of the throughput measurement. Hereinafter, the communication state of the public line supplied by the telecommunications carrier (A) is measured between the interface communication apparatus 10A and the interface communication apparatus 20A. Also, the data for measurement is transmitted from the interface communication apparatus 10A to the interface communication apparatus 20 for the throughput measurement.

When the time to measure the communication state of the communication path has come (step S1), the interface communication apparatus 10A at the transmitting side determines whether or not the data is being transmitted or received (step S2). If there is a large volume of data transmitted or received or if the data for measurement is transmitted at the same time with the data, the measurement result will be influenced. Hence, it is preferable that the transmission start time of data is set at a different time from that of the data for measurement.

If the data is being transmitted or received (step S2/YES), a predetermined period of time is waited for. If the data is not being transmitted or received (step S2/NO), the interface communication apparatus 10A notifies the data volume to be transmitted and the time to start transmitting data, to the interface communication apparatus 20A at the site Y (step 53). The communication path for transmitting the data may be used for this communication, or the control line exclusively provided may be used.

When the transmission start time notified to the interface communication apparatus 20A at the receiving side has come, the interface communication apparatus 10A at the site X start transmitting the TCP data or UDP data for measurement (step 84). Then, if the data having the data volume to be transmitted is finished transmitting (step S5/YES), the interface communication apparatus 10A notifies the completion of data transmission to the interface communication apparatus 20A (step S6). Next, the interface communication apparatus 10A transmits a forward request of the measurement result to the interface communication apparatus 20A (step S7). Optionally, in the forward request of the measurement result, the communication path for data transmission may be used, or the control line exclusively provided may be used.

Next, the interface communication apparatus 10A that has received the measurement result transmits such received measurement result to the interface communication apparatuses 10B and 10C at an identical site, or to the data distributing communication apparatus 12 in the configuration shown in FIG. 6.

Then, the interface communication apparatus 10A evaluates the communication quality of the communication path on the basis of the measurement result obtained from the interface communication apparatus 20A (step S9). Evaluated are the data volume of the measurement data that can be received by the interface communication apparatus 20A at the receiving side and the communication quality of the communication path on the basis of the forwarding time of the measurement data. The measurement method will be described later. After calculating the evaluation result, the interface communication apparatus 10A changes the evaluation value of the information of the forward destination on the basis of so calculated evaluation result (step S10). That is to say, a low value of the evaluation value is set for the communication path of excellent communication quality, and a high value of the evaluation value is set for the communication path of poor communication quality.

In the above-described flowchart, the measurement result is transmitted to another interface communication apparatus; however, the evaluation value obtained from the measurement result by the interface communication apparatus 10A may be transmitted to another interface communication apparatus.

The round trip time is obtained by measuring the time from the moment when Internet Control Message Protocol (ICMP) data is transmitted from the interface communication apparatus at the transmitting side to the receiving side to the moment when the response is returned from the interface communication apparatus at the receiving side.

The measurement of the data loss rate is calculated by measuring the rate that the response data (ICMP replay) is not returned after the ICMP (ICMP echo) data is transmitted to the interface communication apparatus at the receiving side from the interface communication apparatus at the transmitting side.

Then, the evaluating portion 33 evaluates effective bandwidth, transmission delay, reliability, and stability on the basis of so measured throughput B [bps], round trip time D [msec], and data loss rate L [%]. Evaluation formulas are shown below.

The evaluating portion 33 evaluates the effective bandwidth of the communication path by use of a formula (1) shown below.

$$\text{Effective bandwidth}=B2/\{(1-L)\} \quad (1)$$

The transmission delay is an item for evaluating whether or not the real-time level is suitable for the communication of necessary data such as sound data or the like. The evaluating portion 33 evaluates the transmission delay by use of a formula (2) shown below.

$$\text{Transmission delay}=B \times D^2 \quad (2)$$

The reliability is an item for evaluating whether or not the important data or high priority data can be transmitted. The evaluating portion 33 evaluates the reliability by use of a formula (3) shown below.

$$\text{Reliability}=(1-L)^2 \times D \quad (3)$$

The stability is an item for evaluating whether or not the sequential data that hardly influences the application can be transmitted even with some slight delay. The evaluating portion 33 evaluates the stability by use of a formula (3) shown below.

$$\text{Stability}=(1-L)^2+j^2 \quad (4)$$

Optionally, in the measurement of the communication state of the communication path, since the load applied to the communication path is different depending on the measurement item, the time interval for the measurement may be varied depending on the measurement item. For instance, in the measurement that applies a large load on the communication path such as the throughput measurement, the frequency of the measurement may be reduced. An example is to carry out the measurement once every several minutes. Also, in the measurement of the data loss rate, since large pieces of relatively small-sized data have to be transmitted, the data should be transmitted as many as 10 to 20 times a minute. In addition, in the measurement of the round trip time, since small-sized data only is transmitted, the data can be transmitted at a regular interval and high measurement frequency can be set. As an example, the measurement is performed 10 to 20 times a minute When the communication quality of the communication path is evaluated, the interface communication apparatuses 10 and 20 in FIG. 1 and the data distributing communication apparatuses 12 and 22 in FIG. 6 change the information on the forward destination on the basis of the evaluation result. The information on the forward destination is provided for every evaluation item of the evaluating portion 33, as shown in FIG. 4. For example, if the evaluating portion 33 determines that the evaluation of bandwidth of the communication path is excellent, a small value is set for the evaluation value of the bandwidth of this communication path. On the contrary, if the evaluating portion 33 determines that the evaluation of bandwidth of the communication path is poor, a large value is set for the evaluation value of the bandwidth of this communication path. In a similar manner, the evaluation values for the transmission delay, reliability, and stability are stored for every communication path, according to the evaluation result of the evaluating portion 33.

Figure 9:
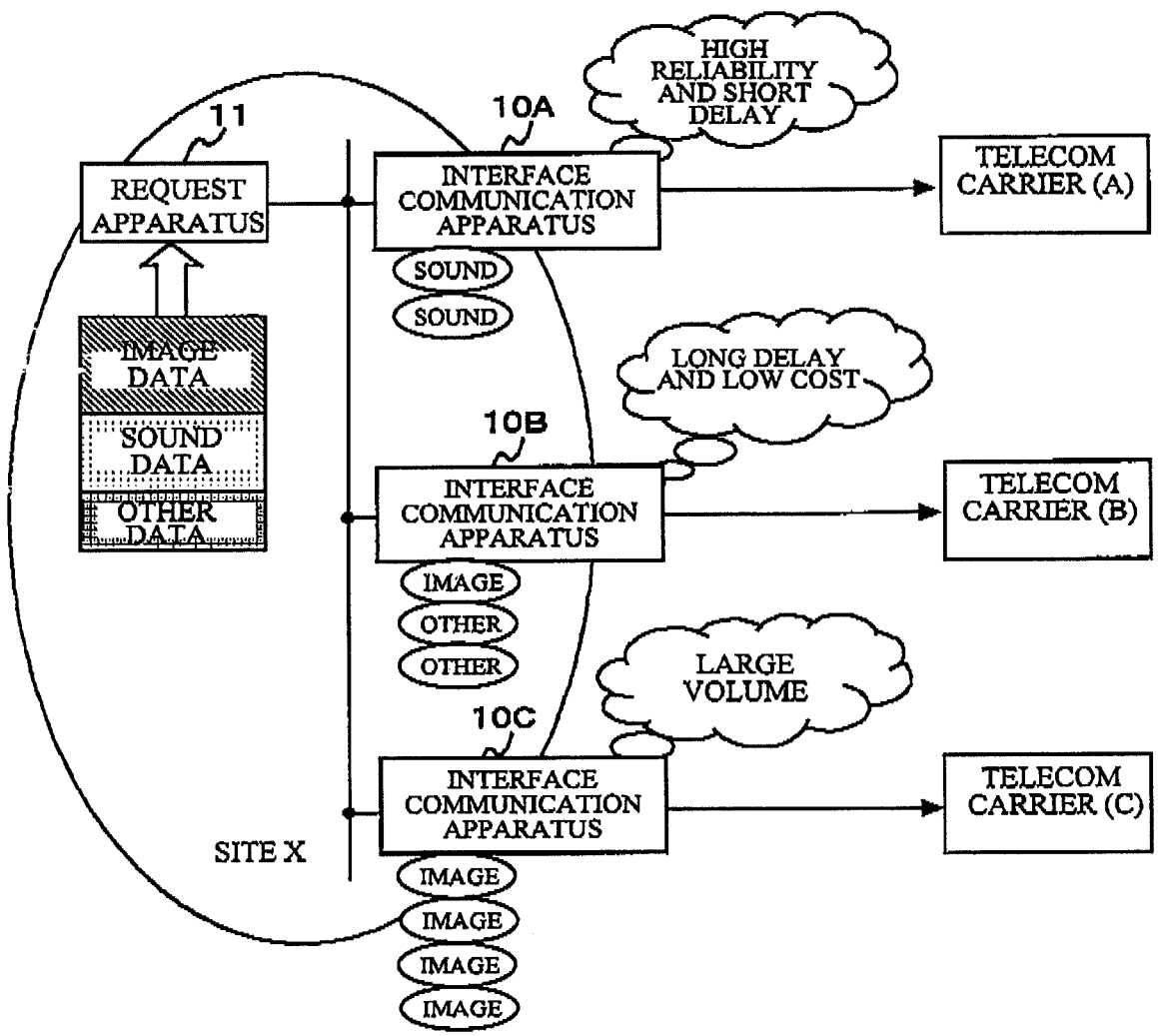
FIG. 9 shows how to change a communication line to be used depending on the data type.

When data is input from one of the request apparatuses 11 and 21, the corresponding interface communication apparatus 10 or 20 in FIG. 1 or the data distributing communication apparatus 12 or 22 in FIG. 6 refers to the information on the forward destination, and distributes the data so that the data can be transmitted over the most suitable communication path. When one of the interface communication apparatuses 10 and 20 shown in FIG. 1 and the data distributing communication apparatus 12 or 22 shown in FIG. 6 receives data from one of the request apparatuses 11 and 21, the characteristic value monitor 37 refers to the characteristic value set in such received data. The characteristic value applied to the data is a value representing the characteristic of the data, and is set for every item such as the data volume, priority, importance level, and the like. The data distributor 38 compares the characteristic value set for every item and that of the information on the forward destination, and selects a most suitable route. FIG. 9 shows a state in which the forward destination is changed according to the data characteristic. For example, if it is determined that the data has a large data volume from the characteristic value, the communication path of a large bandwidth is selected The communication path having large reliability or stability is selected for the data having a high importance level.

(Configuration of Request Apparatus)

Figure 10:
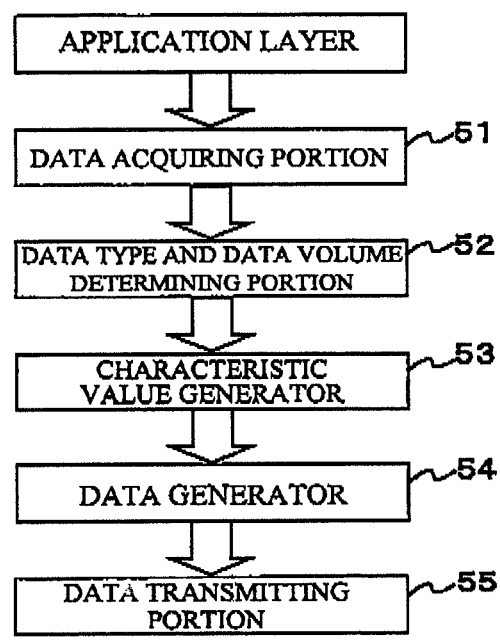
FIG. 10 shows a software configuration to be installed in a request apparatus.

Hereinafter, a description will be given of software to be installed in each of the request apparatuses 11 and 21. FIG. 10 shows functional blocks of the software to be installed in the request apparatuses 11 and 21. This software includes: a data acquiring portion 51 that acquires data from an application program; a data type and data volume determining portion 52 that determines which image data, sound data, character data, image data, or the like is acquired and also determines the data volume; a characteristic value generator 53 that generates a characteristic value according to the determination result of the data type and data volume determining portion 52; a data generator 54 that generates data to which the characteristic value generated by the data type and the data volume determining portion 52 is applied; and a data transmitter 55 that forwards the generated data to one of the interface communication apparatuses 10 and 20 shown in FIG. 1 and the data distributing communication apparatuses 12 and 22 shown in FIG. 6.

Also, how to identity the data type may include various methods, however, the data type can be identified by referring to the content such as header information, data structure, format, and the like of the file, as a file command of UNIX (registered trademark). Details are disclosed in URLs below.

Http://www.freebsd.org/cgi/man.cgi?query=file& apropos=0&sektion=1&manpath=FreeBSD+6.1-RELEASE&format=html Http://www.freebsd.org/cgi/man.cgi?query=magic& apropos=0&sektion=5&manpath=FreeBSD+6.1-RELEASE&format=html (Data Structure)

Figure 11:
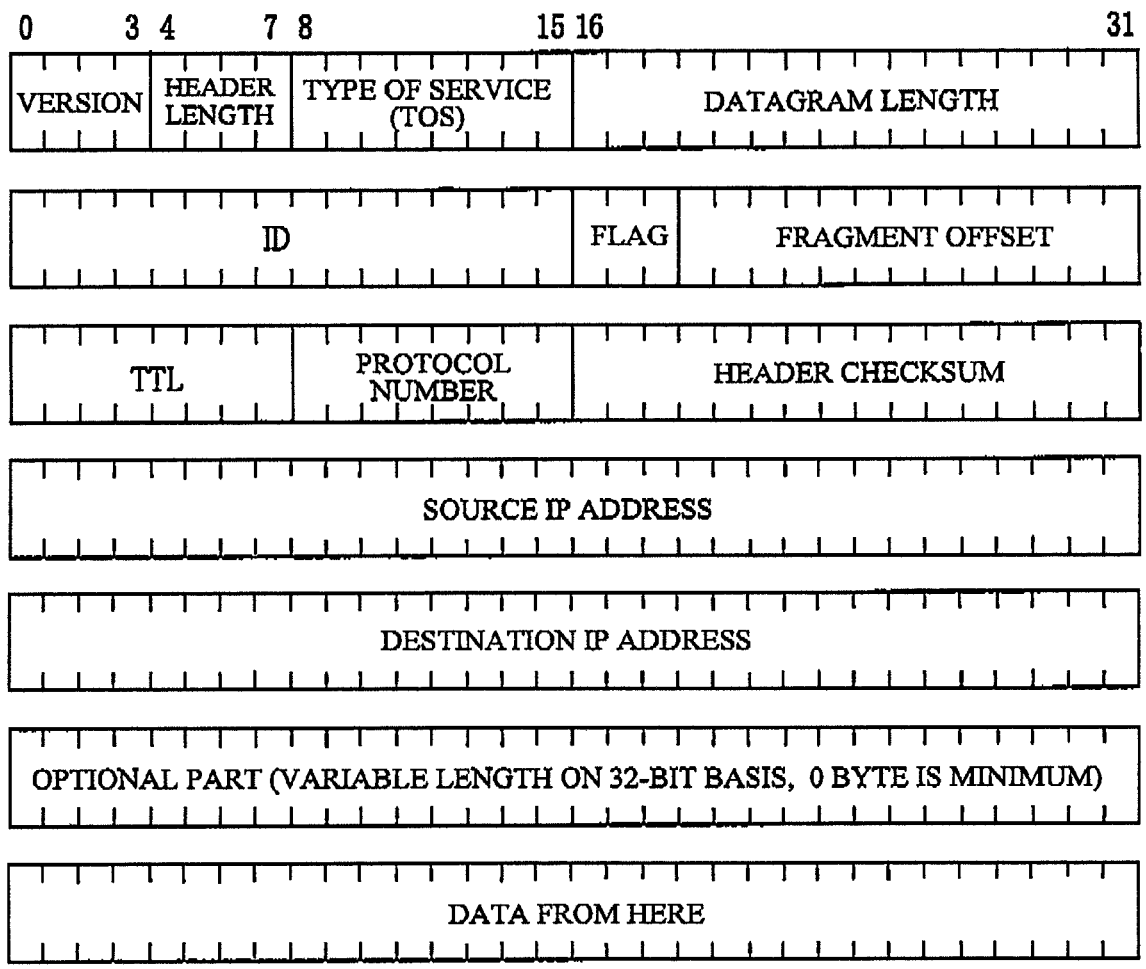
FIG. 11 shows a data structure.

Next, a description will be given of the characteristic value to be embedded in data. FIG. 11 shows an example of the data structure. This data structure is defined in 3.1 of Internet Protocol, RFC 791.

Figure 12:
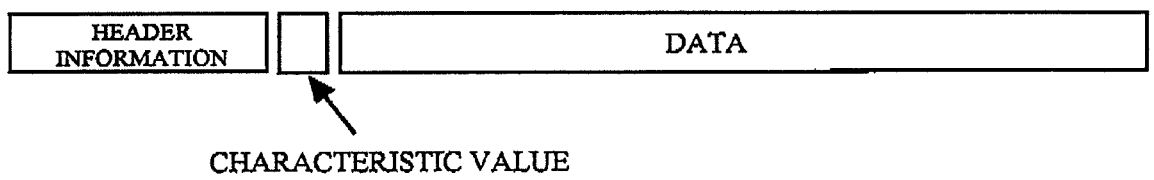
FIG. 12 shows a data structure that includes a characteristic value.

As a characteristic value, the value of Type of Service (TOS) field in the data structure shown in FIG. 11 may be changed and the characteristic value may be applied. The characteristic value may be applied to an optional part (free selection part) of the data. Also, a field as many as eight bits may be inserted into the beginning of the data so as to set the characteristic value in this field, as shown in FIG. 12.

Figure 13:
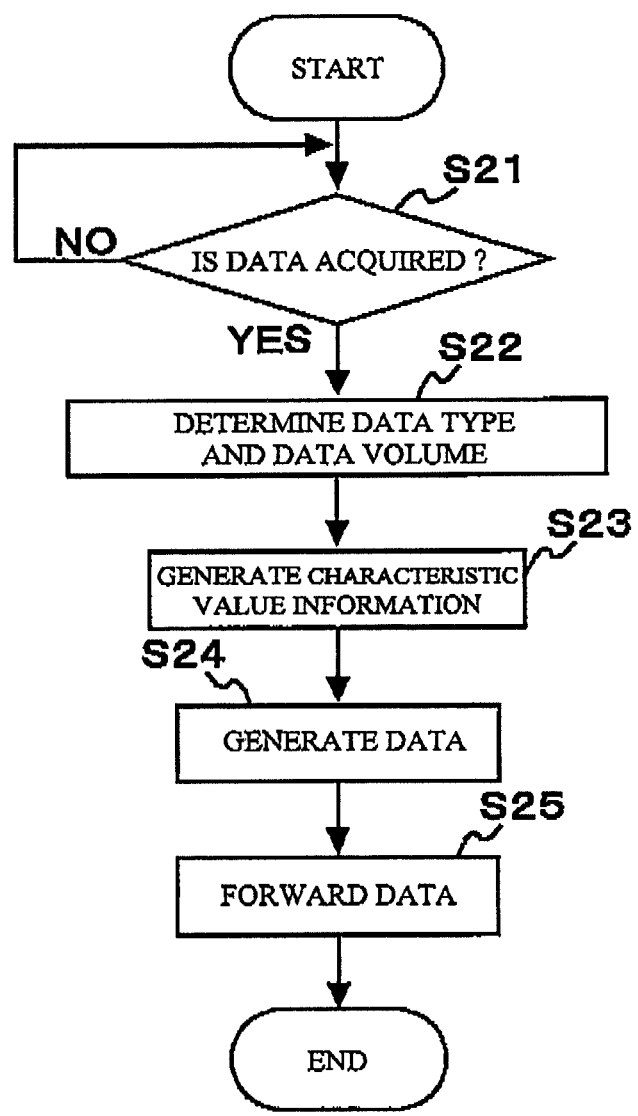
FIG. 13 is a flowchart showing a process procedure of the request apparatus.

Referring now to FIG. 13, the control procedure of the software shown in FIG. 10 will be described.

When the data is acquired from the application software (step S21/YES), the data type and data volume determining portion 52 determines the data type and the data volume (step S22). The characteristic value generator 53 generates the characteristic value representing the characteristic of data from such determined data type, data volume, data priority set by the application software, and the importance level (step 523). The data generator 54 generates the data in which the characteristic value is embedded (step S24), and then outputs the data to the data transmitter 55 (step S25). The data transmitter 55 forwards the data to the corresponding one of the interface communication apparatuses 10 and 20 shown in FIG. 1 and the data distributing communication apparatuses 12 and 22 shown in FIG. 6.

Figure 14:
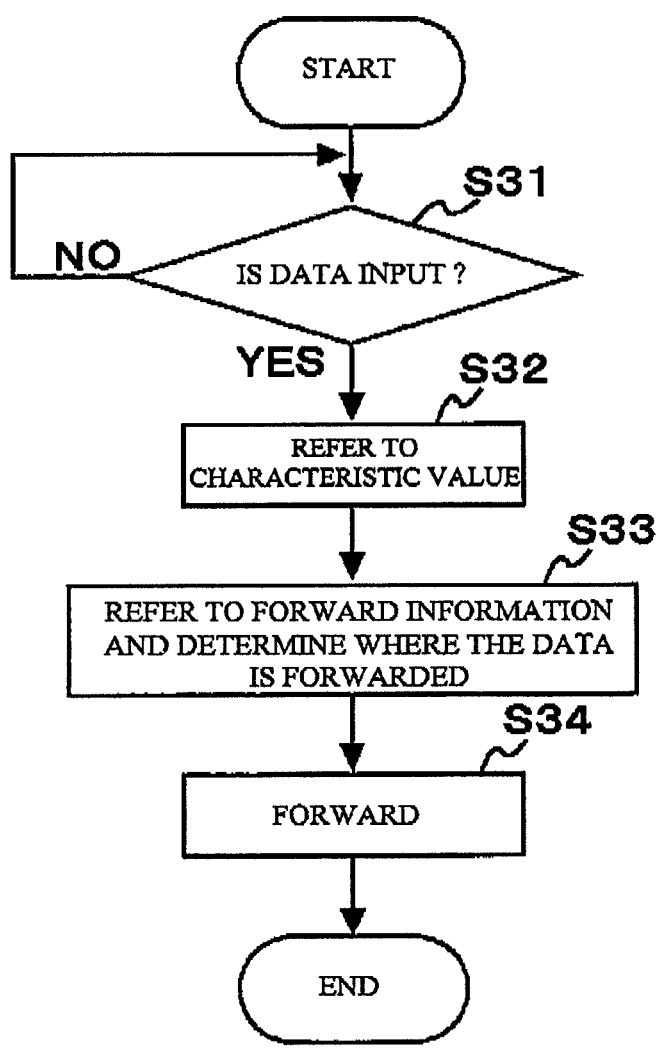
FIG. 14 is a flowchart showing a process procedure of the interface communication apparatus or data distributing communication device.

Referring now to FIG. 14, a description will be given of the process procedure of the interface communication apparatuses 10 and 20, shown in FIG. 1, which receive the data. The data distributing communication apparatuses 12 and 22 also operate by the same process procedure.

When the data is input (step S31/YES), the interface communication apparatuses 10 and 20 refer to the characteristic value applied to the data by the characteristic value monitor 37 (step S32). Such input data includes the characteristic value in which the data type, data volume, priority, importance level, and the like are set. The characteristic value monitor 37 notifies the characteristic value set in the data to the data distributor 38. The data distributor 38 refers to the information on the forward destination of the forward destination information memory 35, and selects one of the interface communication apparatuses 10 and 20 connected to the communication path most suitable for the transmission of this data (step S33). After selecting one of the interface communication apparatuses 10 and 20, the data distributor 38 forwards the data to such selected one of the interface communication apparatuses 10 and 20 (step S34).

(Second Exemplary Embodiment)

A description will now be given of a second exemplary embodiment of the present invention, with reference to the accompanying drawings. In accordance with the present exemplary embodiment, the system employed in the first exemplary embodiment is for use in a television conference system.

Figure 15:
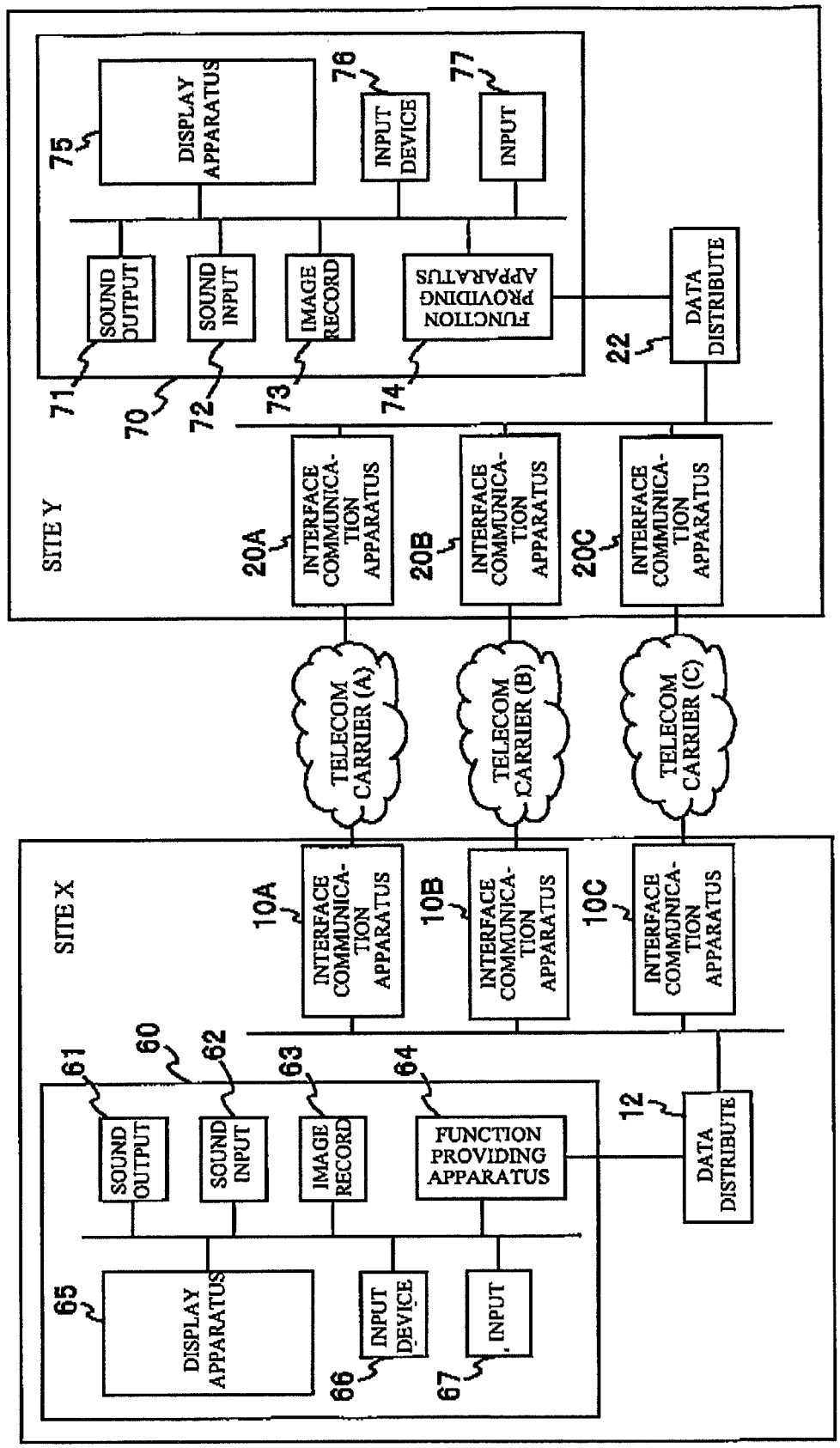
FIG. 15 shows a system configuration in accordance with a second exemplary embodiment of the present invention.

FIG. 15 shows a system configuration used in the present exemplary embodiment. There is installed in the site X, a conference apparatus 60 composed of: a sound outputting apparatus 61; a sound inputting apparatus 62; an image recording apparatus 63; a function providing apparatus (server) 64; a display apparatus 65; an input device 66; an input apparatus 67; and the like. The function providing apparatus 64 is connected to a communication network built in the site X, and the data distributing communication apparatus 12, the interface communication apparatuses 10A, 10B, and 10C are connected to the communication network. Hereinafter, the conference apparatus 60, the data distributing communication apparatus 12, the interface communication apparatuses 10A, 10B, and 10C are referred to as site system. The site Y has a similar system.

After the television conference starts between the site X and the site Y, the image data recorded by the image recording apparatus 63 (73), the sound data input from the sound inputting apparatus 62 (72), or document image read by the input device 66 (76) such as a scanner or by a computer are gathered at the function providing apparatus 64 (74). The software shown in FIG. 10 is installed in the function providing apparatus 64 (74), so as to set the characteristic value such as the data type, data volume, data priority, importance level, and the like of the input data, and to send the data to the data distributing communication apparatus 12 (22).

The data distributing communication apparatus 12 (22) is provided with the information on the forward destination as described in the first exemplary embodiment, and selects one of the interface communication apparatuses 10A, 10B, and 10C (20A, 20B, and 20C).

In the present system, the priority varied depending on the data type is predetermined in the data distributing communication apparatus 12 in order to use multiple types of data such as video data, sound data, image data, character data. The data distributing communication apparatus 12 sets the characteristic value of the input data is set by use of the priority set. For example, the sound data is transmitted more preferentially than other types of data by giving a higher priority to the data that necessitates a prompt forwarding, such as the sound data.

Figure 16:
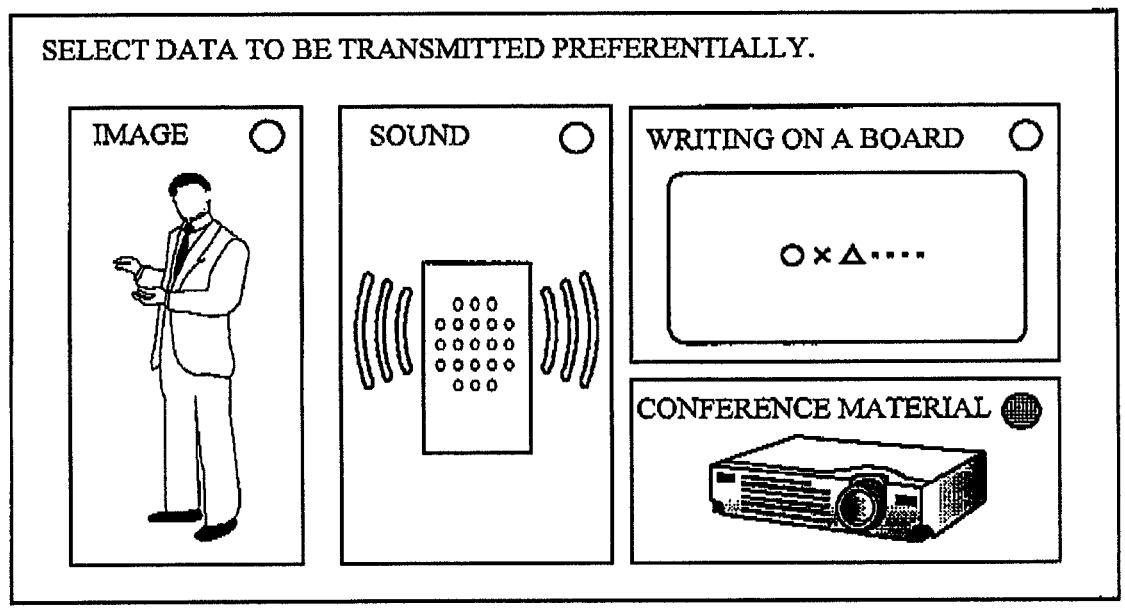
FIG. 16 shows an application screen displayed on a display apparatus.

In addition to this, the display apparatus 65 shown in FIG. 15 may optionally be caused to display an application screen shown in FIG. 16, so that a user may select the data to be more preferentially transmitted by means of the input apparatus 67. That is to say, according to the conference scene, the sound data is preferentially set or the transmission of the document material is preferentially set.

The software installed in the function providing apparatus 64 changes the data which priority is set high, according to the settings set by the setting screen.

Figure 19A:
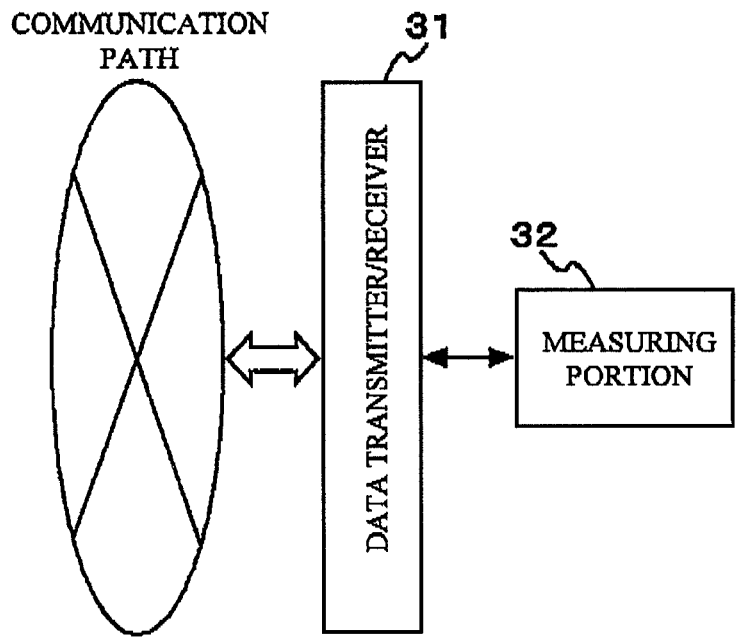
FIG. 19A shows yet another configuration example of the interface communication apparatus.
Figure 19B:
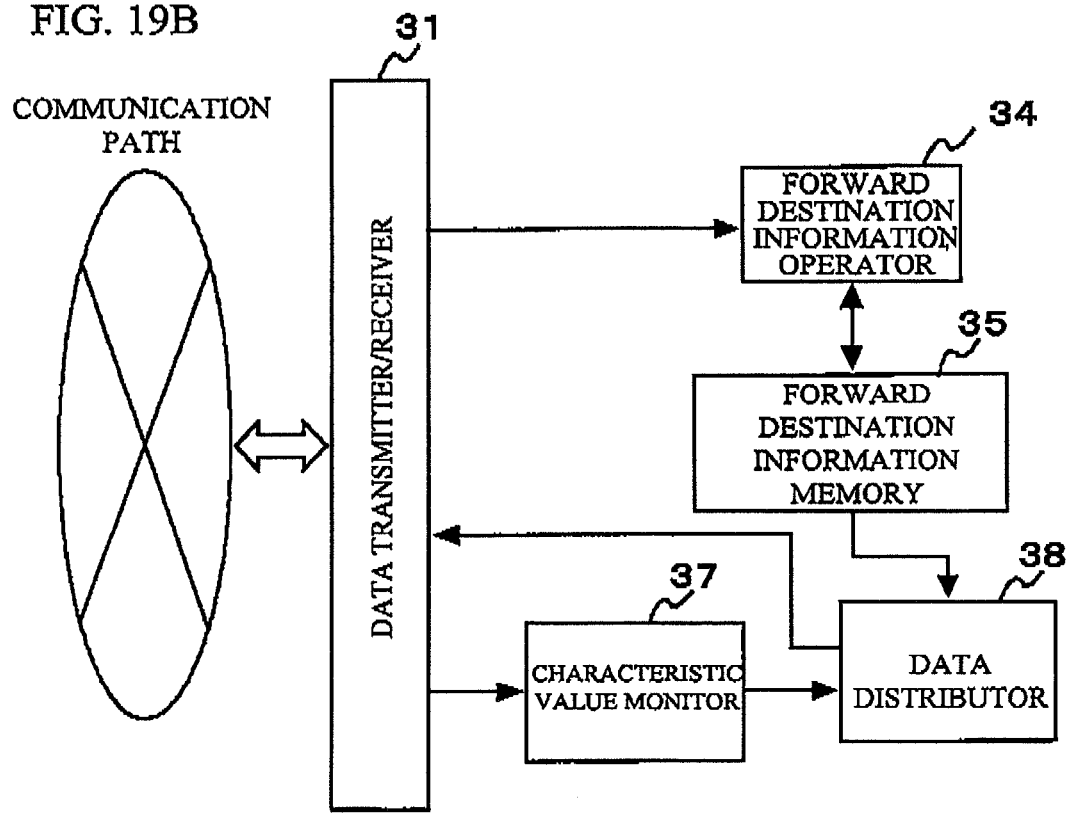
FIG. 19B shows yet another configuration example of the data distributing communication device.

In the first exemplary embodiment previously described, the communication quality of the communication path is evaluated by the interface communication apparatuses 10 and 20 or the data distributing communication apparatuses 12 and 22. On the basis of the evaluation result, the communication path for data communication is determined by the interface communication apparatuses 10 and 20 or the data distributing communication apparatuses 12 and 22. In addition to this, as shown in FIG. 19A and FIG. 19B, according to the measurement result given by the measuring portion 32, the communication path for data communication may be determined. FIG. 19A shows a configuration of the interface communication apparatuses 10 and 20. FIG. 19B shows a configuration of the data distributing communication apparatuses 12 and 22. The data distributing communication apparatuses 12 and 22 respectively acquire the information representing the communication state of the communication path from the interface communication apparatuses 10 and 20, and store the information in the forward destination information memory 35. When distributing the data, the data distributing communication apparatuses 12 and 22 respectively determines any of the interface communication apparatuses 10 and 20 to which the data is output, with reference to the information on the communication state.

Even if the measuring portion 32 is not provided in particular, the communication state or the communication quality may be detected from a re-forwarding rate and stored as history information, at the time of acquiring the information representing the communication quality or the communication state from the outside, determining the communication path to which data is distributed, or transmitting or receiving the actual data by means of the data transmitter/receiver 31. The communication path to which the data is distributed may be determined with reference to the history information.

In accordance with the above-described exemplary embodiment, four evaluation items of the effective bandwidth, transmission delay, reliability, and stability are evaluated as the evaluation items of the communication quality of the communication path; however, at least one of the items may be evaluated. For example, if one evaluation item is evaluated, the characteristic value, comparable with the evaluation value, of the input data may be selected and the characteristic value may be compared with the evaluation value. The communication path may be determined by comparing whether the evaluation value is greater or smaller than the characteristic value.

A method for determining a communication path employed according to an aspect of the present invention is performed with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-237059 filed Aug. 31, 2006.

What is claimed is:

1. A communication system comprising:
a plurality of interface communication apparatuses corresponding to and provided for respective ones of a plurality of communication paths in a one-to-one relationship,
each of the interface communication apparatuses comprising:
a measuring portion which measures communication state parameters of the corresponding communication path;
an evaluating portion which evaluates a communication quality of the corresponding communication path based on the measured communication state parameters from the measuring portion, and generates an evaluation result of the communication quality; and
a common portion which communicates the measured parameters and the evaluation result to other interface communication apparatuses; and
a data distributing apparatus which determines a communication path from among the plurality of communication paths based on the measured parameters and the evaluation result from the communication paths, and distributes data to the determined communication path.

2. A communication system that conducts a conference by data communication, the communication system comprising:
a first site;
a second site, the second site being coupled to the first site by a plurality of communication paths;
each of the first site and the second site comprising:
a plurality of communication apparatuses provided in a number that corresponds to the communication paths, each communication apparatus corresponding to a respective one of the communication paths in a one-to-one relationship and communicates to the other site by connecting the corresponding communication path; and
a processing apparatus that outputs a sending request for conference data communicated between the first site and the second site to a communication apparatus selected from the plurality of communication apparatuses in a same site as the processing apparatus,
each of the communication apparatuses of the first site and the second site comprising:
a measuring portion that measures communication state parameters of the corresponding communication path coupled to the communication apparatus;
an evaluating portion that evaluates a communication quality of the corresponding communication path based on the measured communication state parameters from the measuring portion; and
a sending portion that sends an evaluation result of the communication quality from the evaluating portion to the processing apparatus in a same site as the communication apparatus,
wherein the processing apparatus refers to a data type of the conference data when sending the conference data to the other site, selects the communication path to send the conference data based on a data priority set preliminarily depending on the data type and the evaluation result of the communication quality of the corresponding communication path, and outputs the sending request for conference data by outputting the conference data to the communication apparatus coupled to the selected communication path, and the processing apparatus selects the communication path to send conference data based on a received data priority and the evaluation result of the communication quality of the corresponding communication path and outputs the sending request for conference data by outputting the conference data to the communication apparatus coupled to the selected communication path if the data priority is received from a conference participant.

3. The communication system according to claim 2, wherein the measuring portion measures at least one of a volume of the data to be communicated on each communication path per unit time, a response time when a response to the data transmitted to the communication path is returned, and a rate that the response to the data transmitted to the communication path is not returned within a predetermined period.

* * * * *